United States Patent [19]

Abodishish et al.

[11] Patent Number: 5,062,887

[45] Date of Patent: Nov. 5, 1991

[54] PROCESS FOR CHLORIDE REMOVAL FROM SPONGE METAL

[75] Inventors: Hani A. M. Abodishish, Ogden; R. James Adams, West Point; Joseph B. White, Ogden, all of Utah

[73] Assignee: Westinghouse Electric Corp., Pittsburgh, Pa.

[21] Appl. No.: 652,694

[22] Filed: Feb. 8, 1991

[51] Int. Cl.$^5$ .............................................. C22B 34/14
[52] U.S. Cl. ........................................ 75/425; 75/611; 75/612; 75/618
[58] Field of Search ................. 75/415, 611, 612, 618, 75/10.28

[56] References Cited

U.S. PATENT DOCUMENTS 4,711,664  12/1987  Kwon et al. ........................... 75/618

FOREIGN PATENT DOCUMENTS 248396  12/1987  European Pat. Off. ........... 75/10.28
248397  12/1987  European Pat. Off. ........... 75/10.28

*Primary Examiner*—Melvyn J. Andrews
*Attorney, Agent, or Firm*—J. C. Valentine

[57] ABSTRACT

A sponge refractory metal product, especially a zirconium metal sponge, that retains a residual quantity of magnesium chloride following subjection to an initial, conventional, distillation cycle is reprocessed by the addition of virgin magnesium in amount normally within the range of about 20% to about 60% of the weight of such sponge metal product and by passing it through re-distillation, including the steps of melting the added virgin magnesium and the sponge metal to open the otherwise closed pores thereof, lowering furnace temperature to solidify the molten magnesium, raising the temperature to vaporize and remove from the furnace the magnesium metal, and again raising the temperature to vaporize and remove from the furnace the initially entrapped magnesium chloride. Thereafter, it is preferable that the temperature be again raised to sinter together any loose particles of the sponge metal. It is believed that a eutectic of the sponge metal is formed during the process.

9 Claims, No Drawings

PROCESS FOR CHLORIDE REMOVAL FROM SPONGE METAL

BACKGROUND OF THE INVENTION

1. Field of the Invention:

The invention has to do with the vacuum distillation of a sponge refractory metal product, such as zirconium and/or hafnium sponge, that has been produced from a metal tetrachloride by the use of magnesium metal as a reductant, the sponge metal product containing a residual amount of magnesium chloride in its pores as an impurity.

2. Description of the Prior Art:

In the production of various refractory metals in sponge form, such as zirconium, hafnium, titanium, and uranium, from tetrachlorides of such metals, magnesium metal is normally utilized as a reductant. This produces a considerable quantity of magnesium chloride, residual amounts of which are difficult to remove from the pores of the sponge metal. Retention of even a relatively small amount of the magnesium chloride in the sponge metal product means that an impure final metal product is obtained in the subsequent processing of the sponge metal.

The usual way of ridding the sponge metal of magnesium chloride is to heat the sponge metal to magnesium-chloride-vaporizing temperature in a vacuum distillation furnace. However, it has been found that often the furnace charge of the sponge metal must be recycled through the vacuum furnace several times before the required high purity of metal desired by subsequent processing is assured.

SUMMARY OF THE INVENTION

In accordance with the present invention, it has been found that if, on the initial processing cycle through the usual vacuum distillation furnaces all the magnesium chloride has not been removed from the sponge metal product, the still impure product is again charged into the distillation furnace together with an amount of virgin magnesium metal, then, when a furnace distillation cycle is applied to melt the virgin magnesium that was added to the furnace charge, the molten magnesium will partially dissolve the sponge metal. As the sponge metal dissolves in the magnesium, the sealed and/or sintered sponge particles will collapse, thereby opening the pores of the sponge metal in which the magnesium chloride is trapped. As the distillation cycle continues, with temperature first lowered to solidify the molten magnesium metal, then raised to vaporize the magnesium metal, and then again raised to magnesium chloride vaporization temperature, such formerly trapped magnesium chloride will be vaporized and positively eliminated from the sponge metal. It is believed that the added magnesium metal forms a eutectic with the sponge metal during the process.

The amount of virgin magnesium effective to accomplish the purpose of the invention will vary depending upon conditions, as will be apparent to those skilled in the art, but the amount used will normally be between about 20% and about 40% by weight of the sponge metal product being treated.

A final raising of the temperature will resinter loose particles of the sponge metal.

DETAILED DESCRIPTION OF THE BEST MODE

The best mode presently contemplated for carrying out the invention is set forth hereinafter with respect to a zirconium sponge metal product produced in the conventional way.

Thus, a batch of 6000 pounds of discrete chunks of impure zirconium sponge metal that had been through the usual vacuum distillation cycle and found to still retain a significant amount of magnesium chloride was charged back into the vacuum distillation furnace with 1800 pounds of pure, virgin magnesium metal ingots, here being 30% of the weight of the sponge metal.

A vacuum distillation cycle was carried out in accordance with the following table of procedural steps:

| TABLE OF PROCEDURAL STEPS (Vacuum Distillation Cycle) | | | |
|---|---|---|---|
| Step | Temp °C. | Vacuum | Time |
| 1 | 350 | 50 micron Hg | 10 hrs. |
| 2 | 450 | 50 micron Hg | 10 hrs. |
| 3 | 750–800 | 1 PSI (Argon) | 10 hrs. |
| 4 | 350 | 1 PSI (Argon) | 8 hrs. |
| 5 | 750–800 | 50 micron Hg | 12 hrs. |
| 6 | 900 | 50 micron Hg | 12 hrs. |
| 7 | 960 | 50 micron Hg | 12 hrs. |
| 8 | 1000–1040 | 50 micron Hg | 10 hrs. |

In step 1, free moisture in the sponge metal was removed. In step 2, water of hydration was removed. In step 3, the added magnesium metal was melted and the surfaces of the zirconium particles were wetted to open the pores thereof. This step was carried out under positive pressure, as indicated. In step 4, the temperature was dropped to solidify the total charge. This step was also done under positive pressure. In step 5, the temperature was raised to 750° C. to remelt the magnesium and a high vacuum was applied. At this time, substantially all pores were open and the total charge of zirconium sponge metal was under a molten pool of magnesium. In step 6, the temperature was raised to 900° C., at which the majority of the magnesium was vaporized with high vacuum; then, as step 7, the temperature was raised to 960° C., at which temperature the remaining magnesium and the magnesium chloride were vaporized and removed under high vacuum. The final step, step 8, was to raise the temperature to 1040° C. so as to resinter loose sponge metal particles together to the usual sponge form.

During the foregoing procedure, apparently the added magnesium metal formed a eutectic with the sponge metal.

The first two steps are optional and required only if moisture exists in the sponge. Steps 3–7 are required to achieve substantially total removal of trapped magnesium chloride. In steps 3 and 5, the temperature may vary between about 750° C. and about 800° C. depending upon circumstances, as will be apparent to and within the normal skill of the art.

The times specified in the above table have been ascertained experimentally and found to be dependent on the total weight and individual chunk sizes of the sponge metal. Therefore, times may vary accordingly as will be apparent to and within the normal skill of the art.

Whereas this invention is here described with reference to a specific embodiment thereof, it is to be understood that various changes may be made in adapting the invention to different embodiments without departing from the broader inventive concepts indicated herein and comprehended by the claims that follow.

We claim as our invention:

1. A process of removing residual magnesium chloride trapped in the pores of a sponge metal product that was produced from a metal tetrachloride by the use of magnesium metal as a reductant and that has had magnesium chloride removed therefrom, comprising charging into a distillation furnace a quantity of said sponge metal product and pure virgin magnesium metal in amount from about 20% to about 40% by weight of said quantity of sponge metal product; heating the material in said furnace under positive pressure at a temperature and for a time sufficient to melt said virgin magnesium metal and to wet said sponge metal product therewith and open the pores thereof; still under positive pressure, lowering the temperature in said furnace sufficiently, and maintaining the lowered temperature for a time sufficient, to solidify said molten magnesium; applying a vacuum within said furnace and raising the temperature therein sufficiently and maintaining the raised temperature for a time sufficient to vaporize most of the magnesium metal and remove it from the furnace; and again raising the temperature sufficiently and maintaining it for a time sufficient to remove from the furnace any remaining magnesium metal and the residual magnesium chloride that was trapped in the pores of the sponge metal.

2. A process in accordance with claim 1, wherein after removal of the magnesium chloride, the temperature in the furnace is again raised sufficiently under vacuum conditions therein and is maintained a sufficient time to resinter any loose metal particles together as sponge metal.

3. A process of removing residual magnesium chloride trapped in the pores of a sponge metal product that was produced from a metal tetrachloride by the use of magnesium metal as a reductant and that has had magnesium chloride removed therefrom, comprising charging into a distillation furnace a quantity of said sponge metal product and pure virgin magnesium metal in amount effective to open the pores of said sponge metal product; heating the material in said furnace under positive pressure at a temperature and for a time sufficient to melt said virgin magnesium metal and to wet said sponge metal product therewith and open the pores thereof; still under positive pressure, lowering the temperature in said furnace sufficiently, and maintaining the lowered temperature for a time sufficient, to solidify said melted magnesium; applying a vacuum within said furnace and raising the temperature therein sufficiently and maintaining the raised temperature for a time sufficient to vaporize most of the magnesium metal and remove it from the furnace; and again raising the temperature sufficiently and maintaining it for a time sufficient to remove from the furnace any remaining magnesium metal and the residual magnesium chloride that was trapped in the pores of the sponge metal.

4. A process in accordance with claim 3, wherein the temperature in the furnace is again raised sufficiently under vacuum conditions after removal of the magnesium chloride and is maintained a sufficient time to resinter any loose metal particles together as sponge metal.

5. A process in accordance with claim 3, wherein free moisture and water of hydration of the sponge metal are vaporized in and removed from the furnace prior to the melting of the virgin magnesium metal.

6. A process in accordance with claim 3, wherein the sponge metal charged into the distillation furnace is in the form of discrete chunks.

7. A process in accordance with claim 3, wherein the sponge metal is an impure refractory sponge metal.

8. A process in accordance with claim 3, wherein the refractory sponge metal is zirconium.

9. A process in accordance with claim 3, wherein upon vaporization of magnesium metal the sponge metal product is under a pool of molten magnesium metal.

* * * * *